(12) United States Patent
Du et al.

(10) Patent No.: US 8,891,526 B2
(45) Date of Patent: Nov. 18, 2014

(54) DATA COMMUNICATION METHOD AND DATA COMMUNICATION APPARATUS

(75) Inventors: Wenhua Du, Shenzhen (CN); Dezhi Tang, Shenzhen (CN); Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 13/183,713

(22) Filed: Jul. 15, 2011

(65) Prior Publication Data

US 2012/0014391 A1    Jan. 19, 2012

(30) Foreign Application Priority Data

Jul. 15, 2010 (CN) .......................... 2010 1 0229808

(51) Int. Cl.
| | |
|---|---|
| *H04L 12/28* | (2006.01) |
| *H04L 12/04* | (2006.01) |
| *H04L 12/26* | (2006.01) |
| *H04L 12/931* | (2013.01) |

(52) U.S. Cl.
CPC .............. *H04L 49/602* (2013.01); *H04L 49/60* (2013.01); *Y10S 370/912* (2013.01)
USPC ............................. 370/392; 370/419; 370/912

(58) Field of Classification Search
CPC .......................... H04L 49/60; H04L 12/2896
USPC ......... 370/229, 235, 236, 254, 351, 352, 357, 370/359, 389, 419, 422, 427, 430, 901–902, 370/912
See application file for complete search history.

(56) References Cited

U.S. PATENT DOCUMENTS

| | | | |
|---|---|---|---|
| 7,539,196 B2 * | 5/2009 | Flavin et al. ................... | 370/394 |
| 2002/0046289 A1 * | 4/2002 | Venkaraman et al. ........ | 709/236 |
| 2006/0050738 A1 * | 3/2006 | Carr et al. ..................... | 370/474 |
| 2009/0003327 A1 * | 1/2009 | Zang et al. .................... | 370/359 |
| 2010/0118867 A1 | 5/2010 | Zang et al. | |
| 2013/0039658 A1 * | 2/2013 | Abbas et al. .................... | 398/52 |

FOREIGN PATENT DOCUMENTS

| | | |
|---|---|---|
| CN | 101098238 A | 1/2008 |
| CN | 101188609 A | 5/2008 |
| CN | 101277195 A | 10/2008 |
| CN | 101277196 A | 10/2008 |
| CN | 101304383 A | 11/2008 |

(Continued)

OTHER PUBLICATIONS

Office Action issued in corresponding Chinese Patent Application No. 201010229808.9; mailed Sep. 26, 2011.

(Continued)

*Primary Examiner* — Omar Ghowrwal
(74) *Attorney, Agent, or Firm* — Brinks Gilson & Lione (57) ABSTRACT

A data communication method and a data communication apparatus are provided. The method mainly includes: receiving, by an adapter card, information elements sent by a first switching network board, in which a format of the information element is an information element format capable of being identified by the first switching network board; and performing, by the adapter card, format conversion on the information elements according to an information element format capable of being identified by a second switching network board, and sending the converted information elements to the second switching network board. In this manner, different types of switching network boards can be interconnected and communicate with each other, so as to implement data transmission between network devices having different structures.

9 Claims, 4 Drawing Sheets

(56) References Cited

FOREIGN PATENT DOCUMENTS

| CN | 101355430 A | 1/2009 |
|---|---|---|
| CN | 101895398 B | 7/2012 |

OTHER PUBLICATIONS

Noble, "Huawei NetEngine5000E: Huawei's Multi-Chassis Capable Core Router," Jun. 24, 2010, 41 pages.

Huawei, "Quidway® NetEngine 40E" Apr. 23, 2010, 4 pages.

IEEE Standards, 802.3, IEEE Standard for Information Technology—Telecommunications and information exchange between systems—Local and metropolitan area networks—Specific Requirements, Part 3: Carrier Sense multiple access with collision detection (CSMA/CD) access method and physical layer specifications, IEEE Computer Society, 2002, 1538 pages.

* cited by examiner

FIG. 1

<Prior Art>

DATA COMMUNICATION METHOD AND DATA COMMUNICATION APPARATUS

CROSS-REFERENCE

This application claims priority to Chinese Patent Application No. 201010229808.9, filed on Jul. 15, 2010, which is hereby incorporated by reference in its entirety.

FIELD OF THE INVENTION

The present invention relates to the field of communication technologies, and in particular, to a data communication method and a data communication apparatus.

BACKGROUND OF THE INVENTION

In network devices, such as a router or an Ethernet switch, a network device is composed of several line cards and switching network boards, in which a switching network board further includes several switching chips, and the switching network boards interconnect the line cards.

When the network traffic is continuously increased, the capacity of one switching network board cannot satisfy the requirement of network communications, and a cluster of switching network boards are used for performing data switching among more and more line cards.

Figure 1:
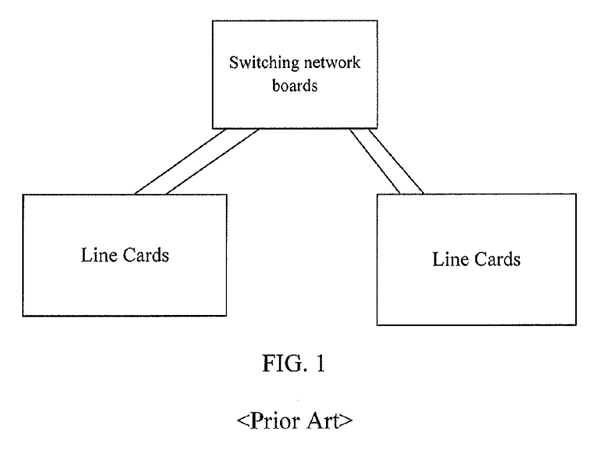
FIG. 1 is a schematic principle diagram of communication among a cluster of switching network boards and a cluster of line cards in the prior art.

FIG. 1 is a schematic principle diagram of communications among a cluster of switching network boards and cluster of line cards in the prior art, and the specific communication process mainly includes the following steps.

The switching network boards interconnect multiple line cards, and forward data packets among the multiple line cards. The forwarded data packets include two types of data packets, one is unicast data packet (forwarded from one line card to another line card) and the other is multicast data packet (forwarded from one line card to one or more line cards).

In use, all line card chassis must be designed to comply with a same switching network communication standard. If not, the data switching would be interrupt for an unacceptable format of the switched data.

Therefore, the communication process among the central switching network board and the line card chassis in the prior art cannot be applicable to the communications among line card chassis complying with different communication standards.

SUMMARY OF THE INVENTION

Embodiments of the present invention provide a data communication method and a data communication apparatus, so as to implement communications among line card chassis having different information element formats.

An embodiment of the present invention provides a data communication method, where the method includes:

receiving, by an adapter card, information elements sent by a first switching network board, in which a format of an information element is an information element format capable of being identified by the first switching network board; and performing, by the adapter card, format conversion on the information elements according to an information element format capable of being identified by a second switching network board, and sending the converted information elements to the second switching network board.

An embodiment of the present invention provides a data communication apparatus, where the apparatus includes:

a first switching network board, configured to send an information element to an adapter card, in which a format of the information element is an information element format capable of being identified by the first switching network board;

an adapter card, configured to receive the information elements sent by the first switching network board, in which the format of the information element is the information element format capable of being identified by the first switching network board, perform format conversion on the information elements according to an information element format capable of being identified by a second switching network board, and send the converted information elements to the second switching network board; and the second switching network board, configured to receive the information elements sent by the adapter card.

An embodiment of the present invention provides an adapter card, where the adapter card includes:

an information element receiving module, configured to receive an information element sent by a first switching network board, in which a format of the information element is an information element format capable of being identified by the first switching network board;

a conversion processing module, configured to perform format conversion on the information elements received by the information element receiving module according to an information element format capable of being identified by a second switching network board; and an information element sending module, configured to send the information elements obtained after the format conversion performed by the conversion processing module to the second switching network board.

It may be seen from the technical solution according to the embodiments of the present invention that, according to the embodiments of the present invention, different types of switching network boards can be interconnected and communicate with each other, so as to implement data transmission between network devices having different structures.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention clearer, the technical solutions of the present invention will be clearly described in the following with reference to the accompanying drawings. It is obvious that the embodiments to be described are only a part rather than all of the embodiments of the present invention. Persons of ordinary skill in the art can derive other embodiments based on the embodiments of the present invention without creative efforts, which all fall within the protection scope of the present invention.

In the embodiments of the present invention, an adapter card receives information elements sent by a first switching network board, in which a format of an information element is an information element format capable of being identified by the first switching network board. Afterwards, the adapter card performs format conversion on the information elements according to an information element format capable of being identified by a second switching network board, and sends the converted information elements to the second switching network board.

To make the embodiments of the present invention more comprehensible, the present invention is further illustrated in the following with reference to the accompanying drawings and several specific embodiments, and the embodiments are not intended to limit the present invention.

Embodiment 1

Figure 2:
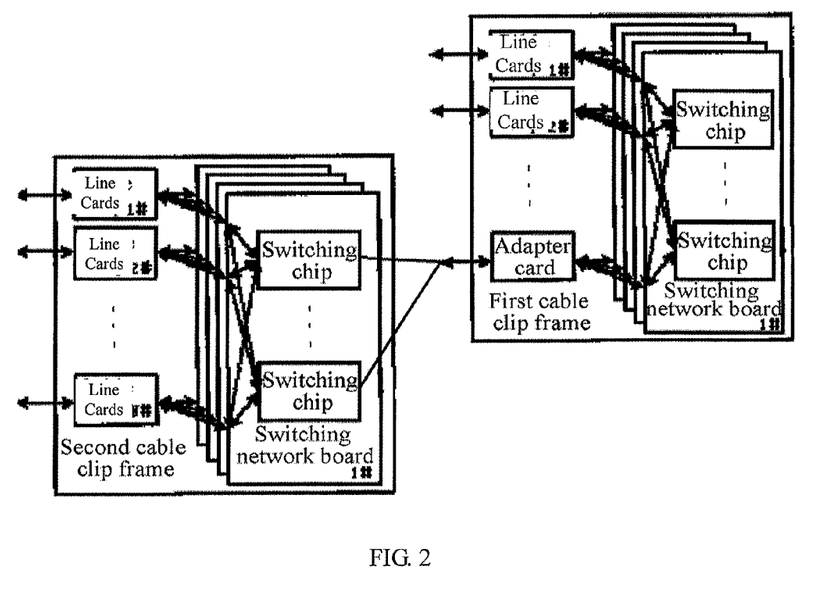
FIG. 2 is a structural diagram of a data communication system according to Embodiment 1 of the present invention.

A structure of a data communication system according to this embodiment is as shown in FIG. 2, and the system includes a first line card chassis and a second line card chassis. The first line card chassis includes a plurality of first line cards, and at least one first switching network board connected to the plurality of first line cards. The second line card chassis includes a plurality of second line cards, and at least one second switching network board connected to the plurality of second line cards.

Only through the switching chips in the first switching network board, can the plurality of first line cards communicate with each other or other nodes, and only through the switching chips in the second switching network board, can the plurality of second line cards communicate with each other or other. An adapter card is set in the first line card chassis, and the adapter card can communicate with all the switching chips in the first switching network board, and all the switching chips in the second switching network board through optical fibers.

In other exemplary embodiments, the adapter card may also be set in a special adapter card chassis, and the adapter card chassis may be set on a communication link between the first line card chassis and the second line card chassis. The adapter card is respectively communicated with the first switching network board in the first line card chassis and the second switching network board in the second line card chassis through optical fibers.

Figure 3:
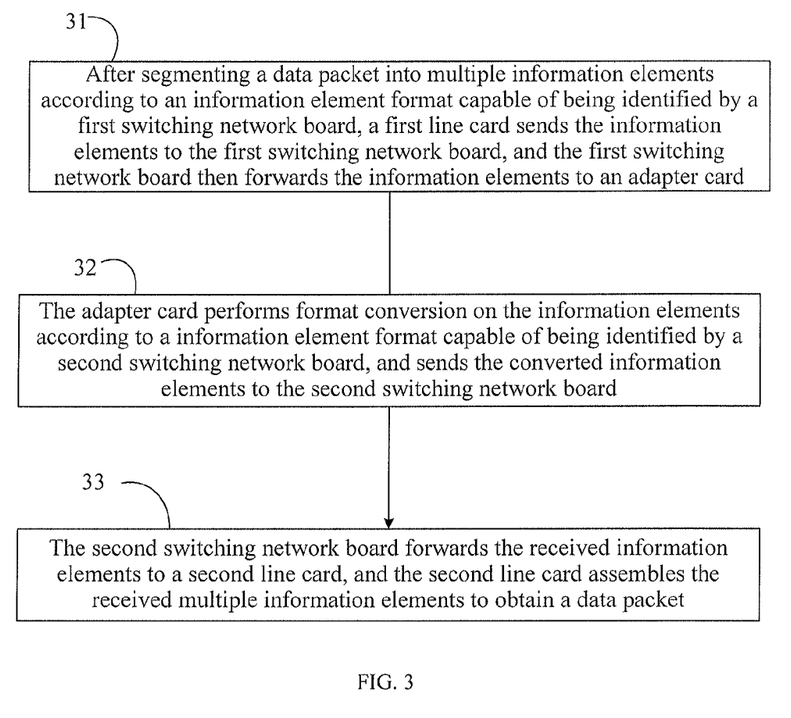
FIG. 3 is a processing flow chart of a data communication method based on the data communication system shown in FIG. 2 according to Embodiment 1 of the present invention.

Based on the data communication system shown in FIG. 2, the processing flow of a data communication method according to this embodiment is shown in FIG. 3, and includes the following processing steps.

Step 31: After segmenting a data packet into multiple information elements according to an information element format capable of being identified by the first switching network board, the first line card sends the information elements to the first switching network board, and the first switching network board then forwards the information elements to the adapter card.

In the data communication system shown in FIG. 2, working mechanisms of the first switching network board and the second switching network board are different, and the format of the information element processed by the first switching network board couldn't be identified by the second switching network board are different. For example, the first switching network board is a crossbar switching network board, and can identify the information element length being 80 bytes and the information element header length being 16 bytes; the second switching network board is a share memory switching network board, and can identify the information element length ranging from 64 to 128 bytes and the information element header length being 8 bytes.

Information of the information element formats capable of being identified by the first switching network board and the second switching network board is stored in the adapter card.

When one of the first line cards has a data packet required to be sent to one of the second line cards, after segmenting the data packet into multiple information elements according to the information element format capable of being identified by the first switching network board, the first line card sends the information elements to the first switching network board. The first switching network board forwards the received information elements sent by the first line card to the adapter card.

Step 32: The adapter card performs format conversion on the information elements according to the information element format capable of being identified by the second switching network board, and sends the converted information elements to the second switching network board.

After receiving the information elements sent by the first switching network board, the adapter card performs the format conversion on the information elements according to the information element format capable of being identified by the second switching network board, and sends the converted information elements to the second switching network board. The information element format conversion includes information element length conversion and information element header conversion.

In the practical application, if the information element formats capable of being identified by the first switching network board and the second switching network board have a great difference, the adapter card may first reassemble the multiple information elements received from the first switching network board into a data packet, then segments the data packet into multiple information elements having the format capable of being identified by the second switching network board, and sends the multiple information elements obtained through segmentation to the second switching network board.

Step 33: The second switching network board then forwards the received information elements to the second line card, and the second line card assembles the received multiple information elements to obtain the data packet.

After receiving the information elements sent by the adapter card, the second switching network board then forwards the received information elements to the second line card, and the second line card assembles the received multiple information elements to obtain the data packet. Therefore, the data transmission between the first line card and the second line card is completed.

According to this embodiment, different types of switching network boards and line cards are interconnected, so as to facilitate interconnections of network devices using different types of switching network boards and line cards, thereby implementing the data transmission between various network devices.

Embodiment 2

Figure 4:
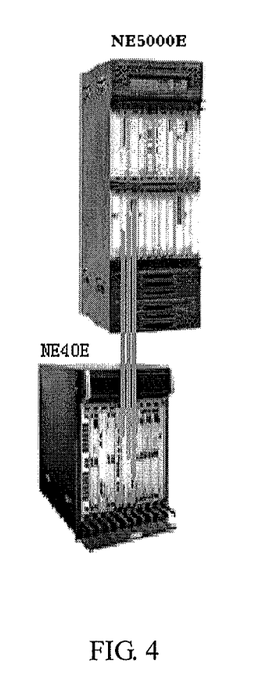
FIG. 4 is a schematic diagram of a multi-chassis switching network formed of two switching network board chassis, that is, a Net Engine 5000E (NE5000E) device chassis and a Net Engine 40E (NE40E) device chassis according to Embodiment 2 of the present invention.

FIG. 4 is a schematic diagram of a multi-chassis switching network formed of two switching network board chassis, that is, an NE5000E device chassis and an NE40E device chassis according to this embodiment. The NE5000E device chassis is formed of 16 line cards and 4 switching network boards, the switching network mode is the share memory, lengths of information elements range from 64 to 128 bytes, and the information element header is 8 bytes. The NE40E device chassis is formed of 8 line cards and 3 switching network boards, the switching network mode is the crossbar, the information element length is 80 bytes, and the information element headers is 16 bytes. The switching network boards in the NE5000E device chassis and the NE40E device chassis are respectively connected to the line cards in the chassis through a SERializer/DESerializer (SERDES) high speed serial line of a Printed Circuit Board (PCB) backplane.

An adapter card is inserted into the NE5000E device chassis, and the adapter card is connected to the 4 switching network boards in the NE5000E device chassis through the SERDES high speed serial line of the PCB backplane; meanwhile, the adapter card is connected to the switching network boards in the NE40E device chassis through parallel optical fibers.

In the practical application, both the NE5000E device chassis and the NE40E device chassis may be multi-chassis structures, that is, both the NE5000E device chassis and the NE40E device chassis may be formed of 1 to N line card chassis and 1 to N central switching board chassis.

Based on the multi-chassis switching network shown in FIG. 4, a data communication process between the NE5000E device chassis and the NE40E device chassis mainly includes the following steps.

When a first line card in the NE5000E device chassis has a data packet required to be sent to a second line card in the NE40E device chassis, after segmenting the data packet into multiple lengthen-changeable information elements according to an information element format capable of being identified by the NE5000E device chassis, the first line card sends the information elements to the switching network boards in the NE5000E device chassis. The lengths of the information elements range from 64 to 128 bytes, and the information element header is 8 bytes.

The switching network boards in the NE5000E device chassis forward the received information elements sent by the first line card to the adapter card, the adapter card performs format conversion on the information elements according to the information element format capable of being identified by the NE40E device chassis, and sends the converted information elements to the NE40E device chassis through the SERDES high speed serial line of the PCB backplane. The information element format conversion includes information element length conversion and information element header conversion, and the length of the converted information element is 80 bytes and the length of the information element header of the converted information element is 16 bytes.

After receiving the information elements from the SERDES high speed serial line, the NE5000E device chassis switches the information elements to the second line card in the NE5000E device chassis. After receiving the information elements, the second line card reassembles a data packet according to the received multiple information elements.

According to this embodiment, in addition to a benefit that the interconnection of two different types of the device chassises is implemented, and the other benefit is that the number available slots in a switching network system may be extended.

It is assumed that the capacity of each slot of the NE5000E device chassis is 400 G, and the capacity of each slot of the NE40E device chassis required to be slowly connected is 100 G. In this embodiment, as long as 2 adapter cards are inserted into the NE5000E device chassis, the traffic of 8 line cards of one NE40E device chassis may be transited at a linear speed, that is, 100 G*8 slot=400 G*2 slot. One NE5000E device chassis has 16 line card slots into which 16 line cards may be inserted. The traffic of 8 NE40E device chassis is transited at a linear speed, so as to provide 64 line card slots of 100 G. Wireless core network products, such as the Gateway GPRS Service Node (GGSN), and the Packet Data Serving Node (PDSN), usually require a large quantity of the line card slots, but the capacity of each line card slot is not high, so the embodiment of the present invention is applicable to this scenario.

Figure 5:
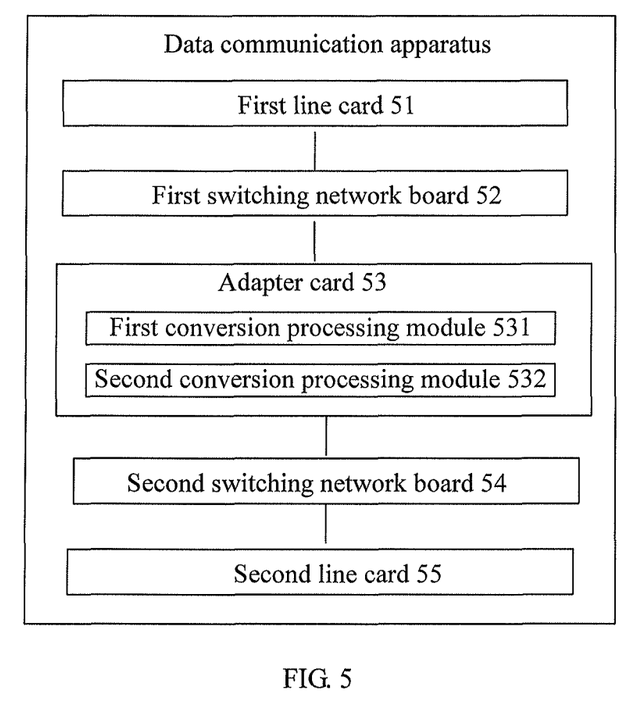
FIG. 5 is a specific structural diagram of a data communication apparatus according to an embodiment of the present invention.

An embodiment of the present invention provides a data communication apparatus, and as shown in FIG. 5, a specific structure of the data communication apparatus includes a first switching network board 52, an adapter card 53, and a second switching network board 54.

The first switching network board 52 and the second switching network board 54 are configured to forward information elements having a certain format, in which information element formats capable of being identified by the first switching network board 52 and the second switching network board 54 are different. When the first switching network board 52 receives the information elements required to be forwarded to the second switching network board 54, the first switching network board 52 sends the information elements to the adapter card 53.

The adapter card 53 is configured to receive the information elements sent by the first switching network board, in which the format of the information element is the information element format capable of being identified by the first switching network board, perform format conversion on the information elements according to the information element format capable of being identified by the second switching network board, and send the converted information elements to the second switching network board.

The adapter card may be set in a first line card chassis formed of a first line card and the first switching network board, and is connected to the second switching network board through an optical fiber. Alternatively, the adapter card may be set in a second line card chassis formed of a second line card and the second switching network board, and is connected to the first switching network board through an optical fiber. Alternatively, the adapter card may be set in an adapter card chassis on a communication link between the first line card chassis and the second line card chassis, and is respectively connected to the first switching network board in the first line card chassis and the second switching network board in the second line card chassis through optical fibers.

In the embodiment of the present invention, the adapter card 52 may further include a first conversion processing module 531, configured to convert lengths and information element headers of the information elements according to the information element format capable of being identified by the second switching network board after the information elements sent by the first switching network board are received, and send the converted information elements to the second switching network board.

In other optional embodiments, the adapter card 52 may further include a second conversion processing module 532, configured to reassemble the received multiple information elements into a data packet after the information elements sent by the first switching network board are received, then segment the data packet into multiple information elements according to the information element format capable of being identified by the second switching network board, and send the multiple information elements obtained through segmentation to the second switching network board.

The data communication apparatus may further include a first line card 51 and a second line card 52.

The first line card 51 is connected to the first switching network board, and is configured to receive the data packet, segment the data packet into multiple information elements according to the information element format capable of being identified by the first switching network board, and then send the information elements to the first switching network board.

The second line card 55 is connected to the second switching network board, and is configured to receive the information elements sent by the second switching network board, and reassemble the data packet according to the received multiple information elements.

Figure 6:
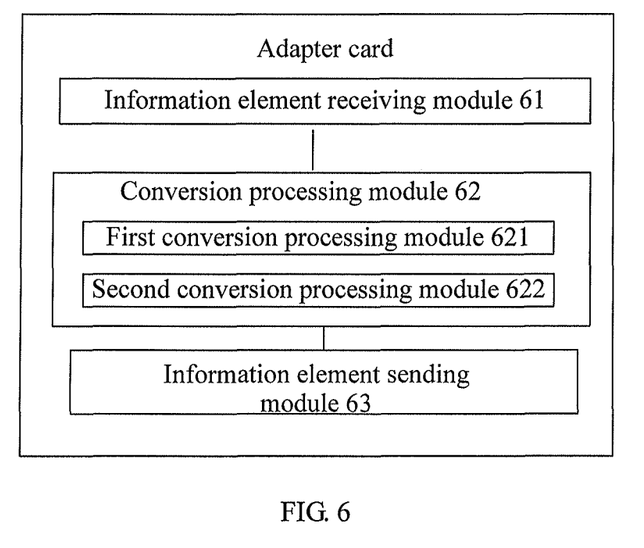
FIG. 6 is a specific structural diagram of an adapter card according to an embodiment of the present invention.

An embodiment of the present invention provides an adapter card, and as shown in FIG. 6, a specific structure of the adapter card includes an information element receiving module 61, a conversion processing module 62, and an information element sending module 63.

The information element receiving module 61 is configured to receive information elements sent by a first switching network board, in which a format of an information element is an information element format capable of being identified by the first switching network board.

The conversion processing module 62 is configured to perform format conversion on the information elements received by the information element receiving module according to an information element format capable of being identified by a second switching network board.

The information element sending module 63 is configured to send the information elements obtained after the format conversion performed by the conversion processing module to the second switching network board.

The conversion processing module 62 includes a first conversion processing module 621 or a second conversion processing module 622.

The first conversion processing module 621 is configured to convert lengths and information element headers of the information elements according to the information element format capable of being identified by the second switching network board after the information elements sent by the first switching network board are received, and send the converted information elements to the second switching network board.

The second conversion processing module 622 is configured to reassemble the received multiple information elements into a data packet after the information elements sent by the first switching network board are received, then segment the data packet into multiple information elements according to the information element format capable of being identified by the second switching network board, and send the multiple information elements obtained through segmentation to the second switching network board.

Those of ordinary skill in the art should understand that, all or a part of processes in the method according to the embodiments may be accomplished by relevant hardware under instructions of a computer program. The program may be stored in a computer-readable storage medium. When the program is executed, the flow of the method according to the embodiments of the present invention is performed. The storage medium may be a magnetic disk, an optical disk, a read-only memory (ROM), or a random access memory (RAM).

To sum up, according to the embodiments of the present invention, different types of switching network boards and line cards are interconnected, so as to facilitate interconnections of network devices using the different types of switching network boards and line cards, thereby implementing the data transmission between various network devices.

According to the embodiments of the present invention, more slots can be extended in a network device, and a high speed slot can be extended into multiple low band slots.

Although the present invention is described above with some exemplary embodiments, the protection scope of the present invention is not limited thereby. Various modifications and variations that can be easily thought of by persons skilled in the art without departing from the scope or spirit of the present invention should fall within the protection scope of the present invention. Therefore, the protection scope of the present invention should fall within the protection scope as defined by the appended claims.

What is claimed is:

1. A data communication method for routers and Ethernet switches, comprising:
   segmenting, by a first line card, a data packet into multiple information elements according to an information element format capable of being identified by a first switching network board, and sending the information elements to the first switching network board;
   receiving, by an adapter card, the information elements sent by the first switching network board; and
   performing, by the adapter card, format conversion on the information elements according to an information element format capable of being identified by a second switching network board, and sending the converted information elements to the second switching network board;
   wherein the information elements are identifiable to the routers and Ethernet switches, and each of the information elements consists of a multi-byte header and a multi-byte payload and belongs to link layer.

2. The data communication method according to claim 1, wherein the performing, by the adapter card, the format conversion on the information elements according to the information element format capable of being identified by the second switching network board comprises:
   converting, by the adapter card, lengths and information element headers of the information elements according to the information element format capable of being identified by the second switching network board;
   or,
   reassembling, by the adapter card, a data packet according to received multiple information elements and then segmenting the data packet into multiple information elements according to the information element format capable of being identified by the second switching network board.

3. The data communication method according to claim 1, wherein after the sending the converted information elements to the second switching network board, the method further comprises:
   forwarding, by the second switching network board, the received information elements to a second line card, and reassembling, by the second line card, the data packet according to the received multiple information elements.

4. A data communication apparatus, comprising: a first line card, a first switching network board, an adapter card, and a second switching network board, wherein the first line card, configured to be connected to the first switching network board, to segment a data packet into multiple information elements according to an information element format capable of being identified by the first switching network board, and to send the information elements to the first switching network board;

the first switching network board and the second switching network board are configured to forward the information elements, wherein information element formats capable of being identified by the first switching network board and the second switching network board are different, and when the first switching network board receives the information elements required to be forwarded to the second switching network board, the first switching network board sends the information elements to the adapter card; and the adapter card is configured to receive the information elements sent by the first switching network board, perform format conversion on the information elements according to an information element format capable of being identified by the second switching network board, and send the converted information elements to the second switching network board;

wherein the information elements are identifiable to routers and Ethernet switches, and each of the information elements consists of a multi-byte header and a multi-byte payload and belongs to link layer.

5. The data communication apparatus according to claim 4, further comprising:

a second line card, configured to receive the information elements sent by the second switching network board, and to reassemble the data packet according to received multiple information elements.

6. The data communication apparatus according to claim 5, wherein the adapter card is set in a first line card chassis formed of the first line card and the first switching network board, and is connected to the second switching network board through an optical fiber;

or, the adapter card is set in a second line card chassis formed of the second line card and the second switching network board, and is connected to the first switching network board through an optical fiber;

or, the adapter card is set in an adapter card chassis on a communication link between a first line card chassis and a second line card chassis, and is respectively connected to the first switching network board in the first line card chassis and the second switching network board in the second line card chassis through optical fibers.

7. The data communication apparatus according to claim 4, wherein the adapter card comprises:

a first conversion processing module, configured to convert lengths and information element headers of the information elements according to the information element format capable of being identified by the second switching network board after the information elements sent by the first switching network board are received, and send the converted information elements to the second switching network board; or a second conversion processing module, configured to reassemble received multiple information elements into a data packet after the information element sent by the first switching network board are received, then segment the data packet into multiple information elements according to the information element format capable of being identified by the second switching network board, and send the multiple information elements obtained through segmentation to the second switching network board.

8. An adapter card, comprising:

an information element receiving module, configured to receive information elements sent by a first switching network board, wherein a format of the information elements is an information element format capable of being identified by the first switching network board, wherein the information elements are sent to the first switching network board by a first line card after the first line card segments a data packet into the information elements according to the information element format capable of being identified by the first switching network board;

a conversion processing module, configured to perform format conversion on the information elements received by the information element receiving module according to an information element format capable of being identified by a second switching network board; and an information element sending module, configured to send the information elements obtained after the format conversion performed by the conversion processing module to the second switching network board;

wherein the information elements are identifiable to routers and Ethernet switches, and each of the information elements consists of a multi-byte header and a multi-byte payload and belongs to link layer.

9. The adapter card according to claim 8, wherein the conversion processing module comprises:

a first conversion processing module, configured to convert lengths and information element headers of the information elements according to the information element format capable of being identified by the second switching network board after the information elements sent by the first switching network board are received, and send the converted information elements to the second switching network board; or a second conversion processing module, configured to reassemble received multiple information elements into a data packet after the information elements sent by the first switching network board are received, then segment the data packet into multiple information elements according to the information element format capable of being identified by the second switching network board, and send the multiple information elements obtained through segmentation to the second switching network board.

* * * * *